United States Patent [19]

Tsujimura

[11] Patent Number: 4,611,256
[45] Date of Patent: Sep. 9, 1986

[54] EJECTION MECHANISM FOR A TAPE RECORDER

[75] Inventor: Fumio Tsujimura, Tokyo, Japan
[73] Assignee: Clarion Co., Ltd., Tokyo, Japan
[21] Appl. No.: 544,773
[22] Filed: Oct. 24, 1983

[30] Foreign Application Priority Data

Nov. 30, 1982 [JP] Japan ................. 57-208599

[51] Int. Cl.[4] ........................ G11B 15/66
[52] U.S. Cl. .................. 360/96.6; 360/96.1; 360/69
[58] Field of Search .......... 360/69, 90, 71, 93, 360/96.1, 96.2, 96.5, 96.6; 242/197–200

[56] References Cited

U.S. PATENT DOCUMENTS

| | | | |
|---|---|---|---|
| 4,308,562 | 12/1981 | Negishi | 360/96.5 |
| 4,319,292 | 3/1982 | Katoh | 360/96.5 |
| 4,509,085 | 4/1985 | Saito | 360/93 |

FOREIGN PATENT DOCUMENTS

| | | | |
|---|---|---|---|
| 3222470 | 1/1983 | Fed. Rep. of Germany | 360/69 |
| 57-105847 | 7/1982 | Japan | 360/96.5 |
| 57-141071 | 9/1982 | Japan | 360/96.5 |
| 57-191862 | 11/1982 | Japan | 360/69 |
| 2051455 | 1/1981 | United Kingdom | 360/96.5 |

Primary Examiner—Raymond F. Cardillo
Assistant Examiner—Steven R. Garland
Attorney, Agent, or Firm—Russell E. Hattis; Stephen R. Arnold

[57] ABSTRACT

An ejection mechanism for a tape recorder has a driving gear driven by a motor and an intermittent gear including a cam portion and disposed so as to engage with said driving gear, in which an operation link is driven through a commuting element having a follower, which is in contact with said driving gear and an eject lever is driven by said operation link so that an eject operation is effected by the motor, and is characterized in that a cassette guide and a pivoting frame for it are connected to an eject element interlocked with said eject lever, a cam edge of a swing lever being in contact with an engaging portion formed in said pivoting frame, a stopping portion and a locking portion being disposed at each of the sides of said cam edge, further including a spring energizing the eject force in the course of the cassette insertion and being disposed between said swing lever and the frame of the recorder.

2 Claims, 12 Drawing Figures

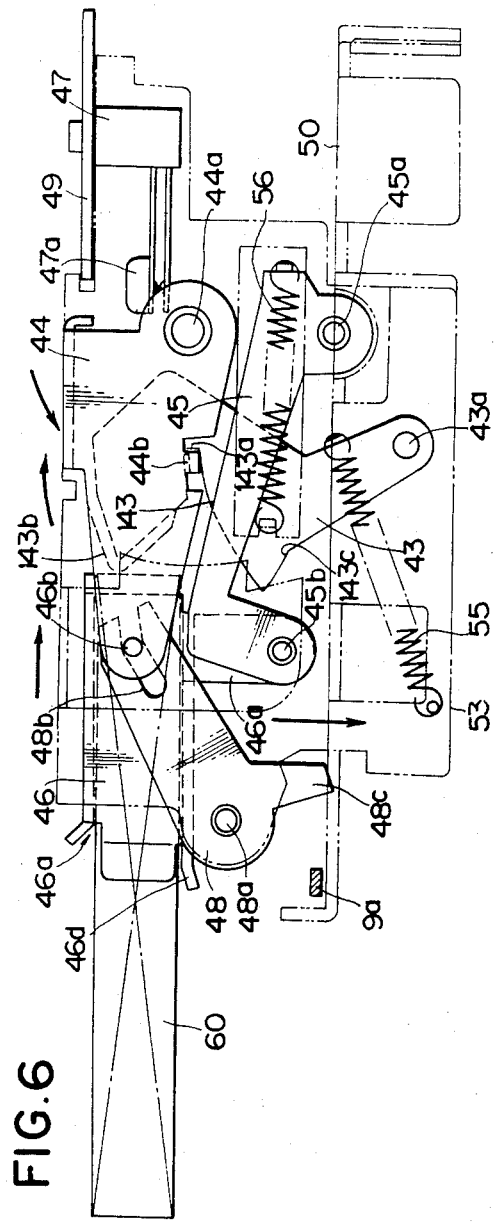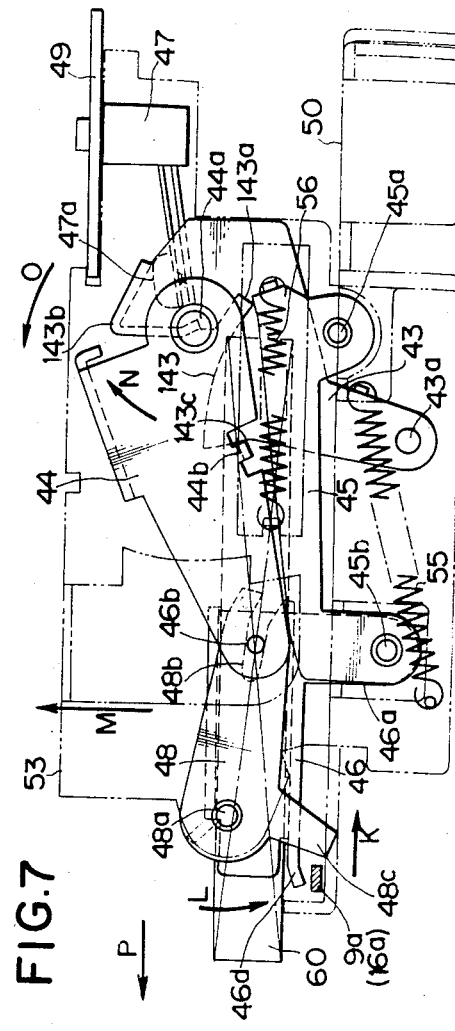

EJECTION MECHANISM FOR A TAPE RECORDER

BACKGROUND OF THE INVENTION

1. Field of the Invention

This invention relates to a new autoeject mechanism for a tape recorder, which mechanism permits to effect smoothly an automatic eject operation in a tape recorder with suitable timing.

2. Description of the Prior Art

For tape recorder operations an automatic eject operation at the tape end is more and more widely utilized, in which such an eject operation is automatically effected by using the rotation force of a motor.

That is, instead of a manual operation heretofore usually effected by a finger, a light operation (so-called feather touch) effects such a commuting operation. Consequently an important advantage can be obtained, facilitating the use of the tape recorder.

However, in this type of tape recorders where the eject operation is automatically effected, the switch disposed in the motor driving circuit usually is opened early to terminate the eject operation and to stop the driving mechanism, and it is difficult to obtain good timing when the motor switch is opened. In the case where a timely eject is not effected, specifically where the eject operation is stopped in mid course, the eject operation should be terminated either by drawing out manually the cassette or by pushing the eject button after having pushed the cassette back to the bottom and reestablishing the playback mode. Since these operations should be effected in a narrow region from which the cassette is charged, these are very difficult and troublesome, and reduce remarkably the usefulness of the autoeject mechanism.

OBJECT OF THE INVENTION

The object of this invention is to provide an autoeject, i.e., motor drive eject mechanism for a tape recorder permitting elimination of the inconveniences mentioned above of the prior art mechanism.

SUMMARY OF THE INVENTION

In order to achieve this object, an autoeject mechanism for a tape recorder according to this invention comprises a motor; a driving gear driven by said motor; an intermittent gear having an intermittent portion disposed so as to engage with said driving gear; a cam portion disposed on said intermittent gear; a commuting element having a follower which is in contact with said cam portion; an operation link interlocked with said commuting element; an eject link disposed so as to be able to engage with said operation link; an eject lever connected to said eject link; an eject element interlocked with said eject lever; a cassette guide; a pivoting frame receiving a cassette inserted through said guide; a swing lever having a cam edge at its extremity and mounted pivotably, said eject element being connected with said cassette guide and said pivoting frame, on which a portion engaging with said cam fringe is formed; and a spring linked with said swing lever, said spring storing eject energy, when the cassette is inserted.

Hereinbelow a preferred embodiment of this invention will be described more in detail, referring to the drawing.

BRIEF DESCRIPTION OF THE DRAWING

FIG. 6 is a plan view representing the arrangement of the same elements, where a cassette has been inserted in the cassette guide;

FIG. 7 is a side view representing movement of the elements displaced by an operation of the autoeject switch;

DESCRIPTION OF THE EMBODIMENT

Figure 1:
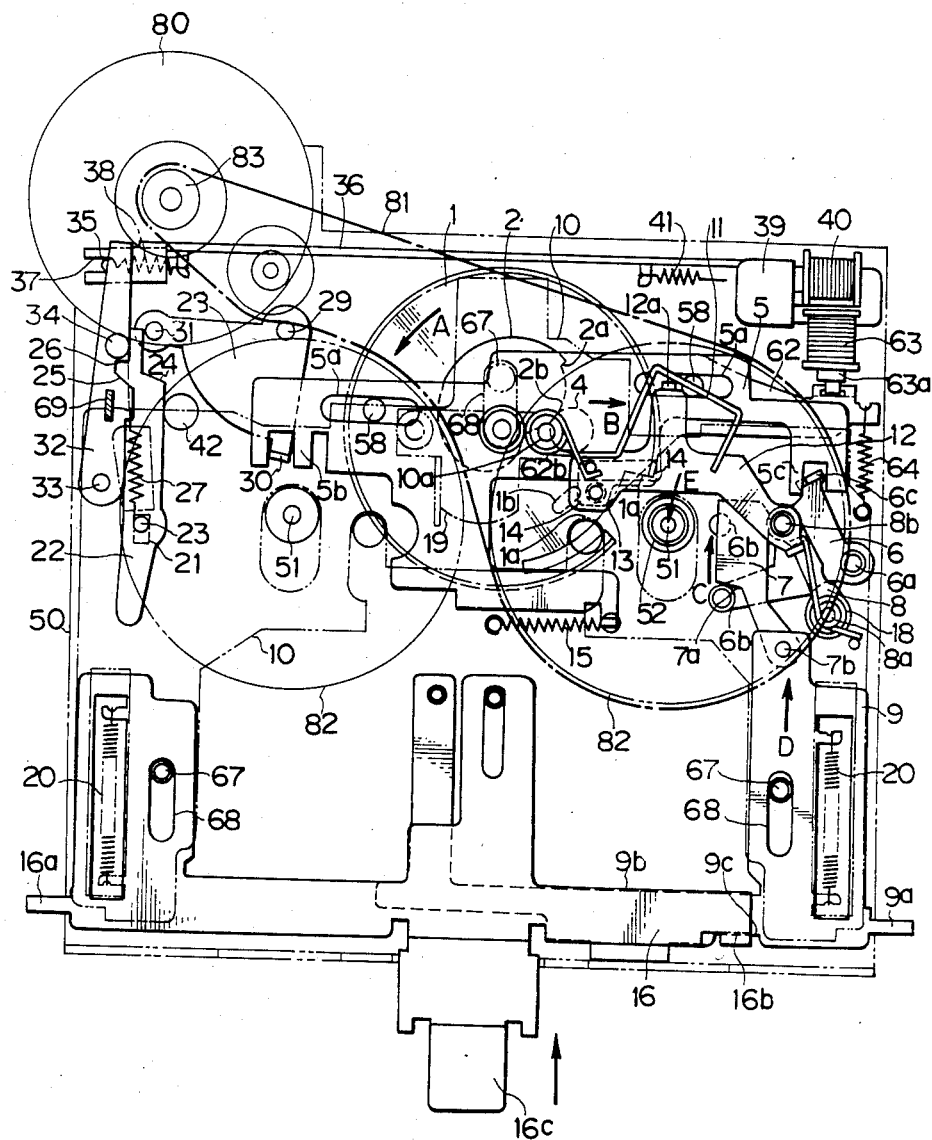
FIG. 1 is a plan view representing the general arrangement of various elements disposed in a rack and, where a head plate has been advanced.

FIG. 1 shows the general arrangement of a tape recorder. As is well known, two capstans 51, 51 are disposed on the rack 50. A gear 52, which is disposed coaxially with respect to one of these capstans 51, is so located that it is coaxial also with respect to one of fly wheels 82, 82 driven by a belt 81, which in turn is driven at the other end by a pulley 83 of a motor 80. The gear 52 engages with an intermittent (cutout) portion 1a formed on a part of the periphery of an intermittent gear 1. When the gear 52 is located opposite the intermittent portion 1a as indicated in FIG. 1, the engagement is broken between the gear 52 and the intermittent gear 1. Further a cam portion 2 is formed in integrally with intermittent gear 1, and has a step portion 2a and a thrust portion 2b are disposed on the commuting portion of the cam periphery. A commuting portion 5 engages slits 5a, 5a which are long in the longitudinal direction, with guide pins 58, 58 disposed on the rack 50, which are so disposed that commutation operations can be effected in right and left directions. Further a follower 4 such as roller disposed on the commuting portion 5, is pushed by a spring 15 located between the commuting portion 5 and the rack 50 and follows the above-mentioned cam portion 2.

The intermittent gear 1 described above has an engaging portion 1b near the above-mentioned intermittent portion 1a. The extremity portion 62b of a stopper element 62 is located against this engaging portion 1b. Said stopper element 62 is pivotably supported by the rightmost of the above-mentioned guide pins 58 and its base part is linked with a core 63b of a solenoid 63. On the other hand a spring 64 is mounted between the rack 50 and the stopper element 62, and when the solenoid 63 is not energized, its extremity portion 62 comes into the rotation region of said engaging portion 1b in the pivoting intermittent gear 1 and stops the clockwise pivoting movement at a predetermined position. Thus a state in which the engagement between the gear 52 and the intermittent gear 1 is broken, is established, as shown in FIG. 1. When the solenoid 63 is energized, the stopping relation between said engaging portion 1b and the extremity portion 62b is released. A head plate 10, engaged with the pins 67, 67, 67 at the guiding slits 68, 68, 68 disposed on the rack 50 can slide up- and downwardly in the figure to a limit determined by the stroke limit of the guiding slits 68. On said head plate 10 are disposed also a head 19, a pinch roller (not shown), which is pushed against said capstan 51, and so forth, and a spring 20 disposed between the rack 50 and the head plate 10 energizes the head plate 10 so that the head 19 is normally drawn back to the release position. An rectangular engaging hole 21 is formed in one side of said head plate 10 and the fulcrum 23 formed in the central part of a control piece 22 is inserted in this engaging hole 21 so that the control piece can move up- and downwardly in the figure. Said control piece 22 has a taper part 24 on one of its extremities and another taper part 25 and a stopping step 26 on the other extremity. Moreover an energizing spring 27 is mounted on the fulcrum 23, and since the tensive force of said energizing spring 27 is greater than that of the aforementioned spring 20, the fulcrum 23 of the control piece 22 touches the upper end of the engaging hole 21.

A sector member 28 is mounted on the rack 50 near said motor 80 by using a pivot 29. An engaging portion 30 formed on one side of the free end engages with the fork-shaped portion 5b of the aforementioned commuting portion 5, and the sector member 28 is pivoted around the pivot 29 by sliding action of said commuting portion 5. On the other side of the free end is mounted an engaging projection 31 which is so located that it can engage with and disengage from the taper portion 24 of the control piece 22 described above. Another engaging projection 34 formed in the central part of the locking piece 32, which is mounted on the rack 50 at a fulcrum 33, is placed against the stopping step 24 of the taper portion 25 of the control piece 22. An engaging portion 35 is formed on one side of said locking piece 32, and on the other hand a complementary engaging portion 37, which engages with the engaging portion 35, is disposed at the extremity of a holding member 36, which is so formed that it can slide at the bottom of the rack 50. Moreover a spring 38 is disposed between said engaging portion 35 and the frame, and furnishes a force to the holding member 36 toward right in the figure. An attracted piece 39 is mounted on the base part of the holding member 36 and a holding solenoid 40 is disposed confronting this attracted piece 39. Further a spring 41 is disposed on this holding member and energizes said attracted piece 39 in the acting direction of the solenoid 40. Moreover the tensive force of the aforementioned spring is greater than that of the spring 41. Consequently, as indicated in FIG. 1, said spring 38 maintains the locked state, in which the attracted piece 39 is attracted by the solenoid 40 and the engaging projection 34 of the locking piece 32 engages with the taper portion 26, hindering upward displacement in the figure of said control piece 22. When the solenoid 40 is switched off, the locked state is dissolved by rotating the locking piece 22 in the counterclockwise direction against the tensive force of the spring 41. A stopper 42 is mounted on the rack 50 and limits the pivoting movement of the control piece 22 in the clockwise direction. On the other hand, a limiting portion 69 limits the pivoting movement of the control piece 22 in the counterclockwise direction, preventing that disengagement of the stopping step 26 from the engaging projection 34 of the locking piece 32 becomes difficult by the fact that the taper portion 24 continues to rotate in the counterclockwise direction, following the locking piece 32 also after disengagement of the taper portion 24 from the engaging projection 31 of the sector member 28.

According to this invention, in addition to the above-mentioned construction, another link portion 5c is formed on the other side of the commuting portion 5, which link portion 5c is linked with the engaging portion 6c of an operation link 6. That is, said operation link 6 is mounted on the lower surface of the rack 50 by using a pivot 6a, and a roller-shaped connecting element 6b is located against the step-shaped connecting portion 7a of the eject link 7, whereas said eject link 7 is connected through a connecting rod 7b to the eject lever 9. Moreover a lock arm 8 having a connecting element 8b at its extremity is mounted on the rack 50 by using a pivot 8a, and the extremity of said lock arm 8 is linked with one of the extremities of a lock plate 12 at its connecting element 8b. At the center part of said lock plate 12 a stopping portion is formed and at the same time a connecting element 13 is mounted at the other end. Said connecting element 13 is engaged in an L-shaped lock hole 14 formed in the rack 50 and further the base part of a spring 11 is fixed to the head plate 10 at the locking part 12a of the lock plate 12 and its free end is mounted at the axial portion 10a, which spring acts as an elastic commuting member. At one end of the above-mentioned eject lever 9 is formed the eject operation part 9a and at the other end an extending part 9b is disposed. This extending part is partly superposed on a half of a separately disposed manual eject lever 16. A stopping portion 16b formed at one end of said manual eject lever 16 engages with a connecting portion 9c, which is a recess formed in the eject lever 9, and when the manual eject lever 16 is pushed, the eject lever 9 is operated at the same time. When the eject lever 9 is operated as is explained later, the manual eject lever 16 is maintained in the nonworking state. A return spring 20 is mounted at each of eject levers 9 and 16. An eject operation part 16a is formed at the other end of the manual eject lever 16 against said operation part 9a and a push button operation part 16c is located in the central part of the rack 50.

Figure 2:
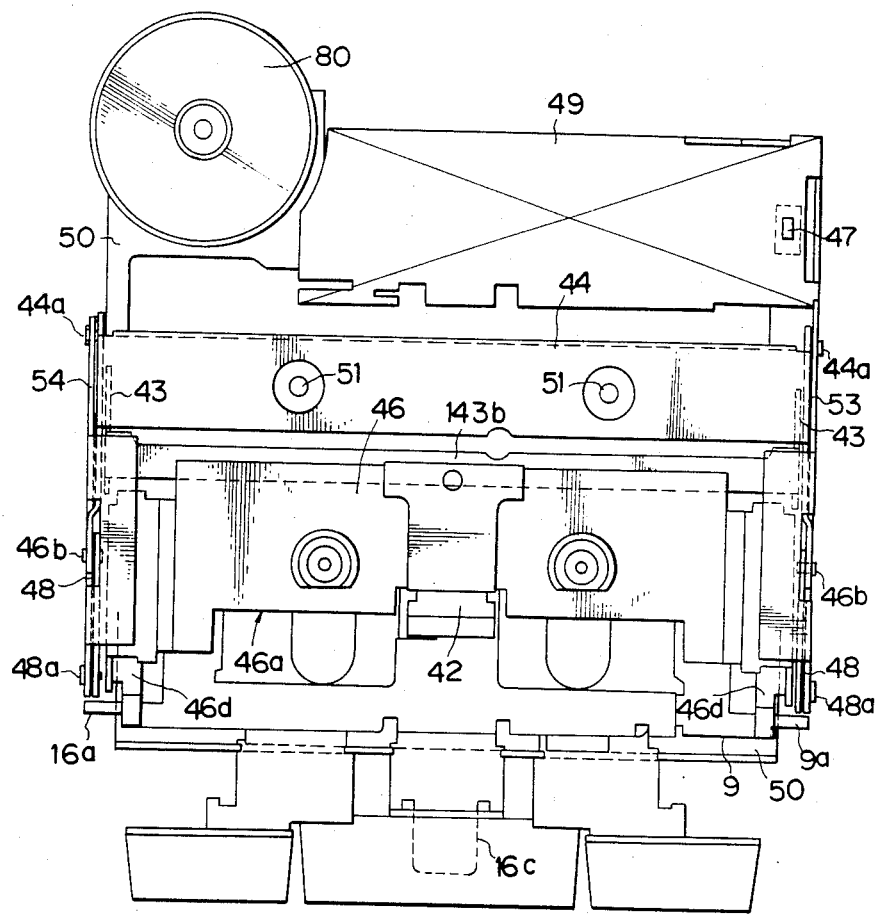
FIG. 2 is a plan view representing the arrangement of a swing lever, a cassette guide and so forth disposed on the rack.

As it can be seen from FIG. 2, supporting plates 53 and 54 are mounted respectively on both sides of the rack 50. At the lower part of each of these supporting plates 53 and 54 is mounted pivotable a swing lever 43 and at its upper part a cassette guide pivotable frame 44 is disposed by using a pivot 44a. A connecting part 44b formed so as to be bent inwardly as indicated in FIGS. 6 and 7 on the lower side of said cassette guide pivotable frame 44 is placed against a cam edge 143 formed at the free end of the swing lever described above, as indicated in FIGS. 5 and 6. A stopping portion 143a is formed at the rightmost end of said cam edge. Further a working portion 143b is formed at a position, which is still higher than that of the stopping portion 143a, as indicated in FIG. 6, so as to oppose the insertion of a cassette 60, which is inserted in a cassette guide 46 in the eject state.

A spring 55 is disposed between the central part, which is nearer to the base part of said swing lever 43, and the rack 50. Said spring 55 has the contracted state, in which the spring is shortest in the eject state as shown in FIG. 6, and starting from this state as the swing lever 43 rotates clockwise, stores energy, extending gradually, when the cassette 60 is inserted either manually or automatically. Finally it has the largest tensive force in the playback state indicated in FIG. 7. This state is located by stopping the connecting portion 44b of the cassette guide pivotable frame 44 in the lock portion 143c, which is located at the base side of the cam edge 143.

Besides the cassette guide pivotable frame 44 and the swing lever 43, which have been described previously, an extremity portion of a pivoting supporter 45 is pivotably mounted at 45a which is at the lower part of the pivoting element 44a. At the other extremity of said pivoting supporter 45 a connecting part 46a formed at the lower part of the bottom of the cassette guide 46 is connected with a pivoting element 45b and a spring 56 is mounted between the base part of the pivoting supporter 45 and the rack 50. A connecting element 46b is formed over the region, where the pivoting element 45b of the cassette guide 46 is disposed. Said connecting element 46b is linked pivotably with the extremity of the cassette guide pivotable frame 44 and at the same time engages with an engaging ditch portion 48b formed in the eject member 48, which is mounted at its base part with a pivoting element 48a on each of said supporting plates 53, 54. An engaging projection 48c disposed under the base part of said eject member 48 is located against either the operation part 9a of the eject lever 9 described above or the eject operation part of the manual eject lever 16. Referring to FIGS. 2 and 6, the cassette guide 46 has an opening 46a at the upper front part of the rack 50 and a supporting member 46b receiving the bottom surface of a cassette is formed at each side of the cassette guide 46 for receiving the cassette 60, as shown in the figure. Also, at the central upper part of such a cassette guide 46 is disposed an elastic piece 42, which presses down the upper surface of the inserted cassette, as shown in FIG. 2. The free end of this elastic piece 42 presses down elastically the cassette and thus secures the state for stable loading of the cassette. At the bottom of the supporting plates 53, 54 is disposed a wiring board 49, as shown in FIGS. 2, 6 and 7. A motor switch 47 is mounted under said wiring board 49. The contact part 47a of said motor switch 47 extends toward the pivotable base part of the cassette guide pivotable frame 44, as shown in FIGS. 6 and 7. The cassette guide 46 throws down the cassette 60 on the rack, and when the swing lever is rotated clockwise around the pivot 43a, the working part 143b of the swing lever 43 comes into contact with said contact part 47a and presses it so that said switches 47 is closed.

Figure 3:
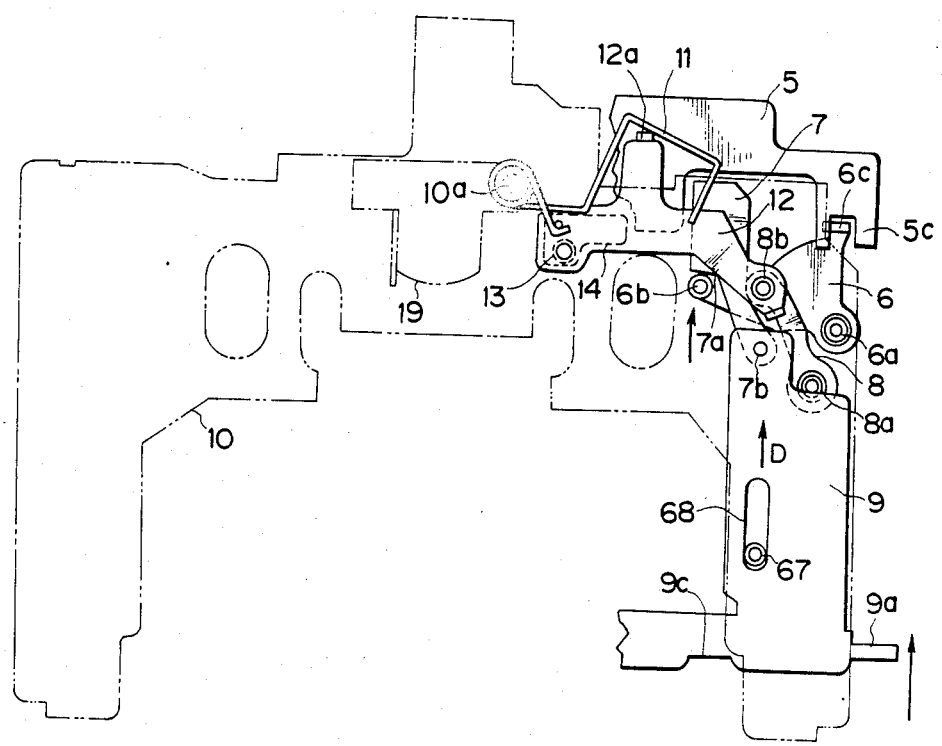
FIG. 3 is a plan view representing the position of the commuting element, the lock plate, the lock arm and the eject lever, when the head plate has been advanced and the operation link has been rotated.

Hereinbelow the working mode of the mechanism described above will be explained more in detail. As is well known, a power switch, disposed in the region where the tape cassette is inserted, is switched on by the insertion of the cassette 60. Then the solenoid 63 (FIG. 1) is energized and moves the stopper member 62 counterclockwise about the rightmost guide pin 58, and the engagement of the engaging portion 1b of gear 1 with the extremity portion 62 is removed. By this fact the cam portion 2 and the intermittent gear 1 are rotated by the spring acting on the commuting element 5 facing the follower 4 engaging with the step portion 2a of the cam portion 2 and the intermittent gear 1 is rotated counterclockwise to engage with the gear 52, which is driven by the motor. Thus, since said cam portion 2 rotates automatically, the follower 4 is slided by the thrust portion 2b of said cam portion 2. The sector member 28 is rotated clockwise by the fact that said commuting element 5 slides toward left in the figure, and displaces the connecting element 31 from the lower part of the taper portion 24, where the element is located till this moment to its upper part. The arrangement thus obtained of the various members and elements is that shown in FIG. 1. By this fact the control piece 22 becomes able to rotate in the clockwise direction, and the lock member 32 and the holding member 36 are displaced toward the right in the figure by the tensive force of the spring 41. Consequently they are attracted and held by the energized holding plunger 40. On the other hand, the follower 4, once it reaches the bottom of the cam portion 2, slides the commuting element 5 toward right in FIG. 1 in the reverse direction by further rotation of the cam portion 2. By this way, the connecting element 31 of the sector member 28 is displaced downwardly in the figure, and the taper part 24 of the control piece 22 is pressed downwardly. Then the pin 67 of the head plate 10 pushes and advances downwardly in the figure from the state in which the pins 67 are in contact with the lower ends of the slits 68 to the state in which they are arrested in the upper ends. As a result the head plate presses the head 19 against the tape and the playback state indicated in FIG. 3 is established. Further, the connecting element 34 of the lock member 32 is pushed toward the taper portion 25, and the lock member rotates against the tensive force of the spring 38 in the counterclockwise direction. Even after the head plate 10 has reached the position for the playback mode with pins 67 arrested in slits 68, as described above, until the follower 4 reaches the highest position of the cam portion, the control piece 22 continues to be pushed downwardly, and the fulcrum 23 displaces downwardly in the rectangular hole 21 against the tensive force of the spring 27. The connecting element 34 of the lock member 32 quits upwardly the taper portion 25 and engages with the stopping step 26 by the tensive force of the spring 38, as indicated in the figure. When the follower 4 advances further from this state and passes through the highest point of the cam portion 2, the gear 2 is disengaged from the intermittent portion 1a of the intermittent gear 1. Under the condition that the plunger is no longer energized the rotation of the intermittent gear 1 is stopped by the extremity portion 62b of the stopper element 62, which has returned by the spring 64 to the stop position at a position which is located exactly against the gear 52. On the other hand the commuting element 5 is energized by the tensive force of spring 15 toward left in the figure, and the follower 4 engages with the step portion 2a. At the same time the sector member 28 gets a rotational force in the clockwise direction. The control piece 22, which is free from the pushing force caused by the connecting element 31 of the sector member 28, is displaced upwardly in the figure by the tensive force of the spring 27, until the taper portion 26 comes in contact with the connecting element 34 of the lock member 32, and thus the state, which is held by the holding force of the holding solenoid 40 and the tensive force of the spring 38, is realized by the process described above and indicated in FIG. 1.

During the charging course of the cassette 60 described above, the mechanism according to the invention furnishes eject force to the above-mentioned spring 55. That is, when the cassette 60 is inserted either manually or automatically from the eject state indicated in FIG. 6, the passive portion 143b of the swing lever 43 is pushed and said swing lever 43 pivots around the pivot 43b, and the spring 55 extends and stores energy, as described above. The connecting portion 44b of the cassette guide pivotable frame 44 quits the engaging portion 143a and then is slided along the arc-shaped cam edge 143. During such a sliding course along the cam edge 143, said cassette guide pivotable frame 44 is held approximately in the state indicated in FIG. 6 and cannot pivot. However, when the cassette 60 is inserted sufficiently, the spring 55 stores sufficient energy. Thus, when the engaging portion 44b reaches the extremity of the cam edge 143, the extremity portion of the pivotable supporting frame 45 is rotated by an action of the spring 56 in the counterclockwise direction and rotates said pivotable support frame 44 in the counterclockwise direction through the cassette guide linked by the pivot 45b. Thus the state indicated in FIG. 7 is established, where the engaging portion 44b is locked in the locking portion 143c.

In the playback state indicated in FIG. 1, which has been described above, when the solenoid 63a is advanced, the intermittent gear 1 is rotated in the direction indicated by the arrow A, as has been already explained. Thereafter (See FIGS. 3, 4, and 5) where the follower 4 is pushed right in the direction indicated by the arrow B, the connecting element 6b of the operation link 6 is rotated in the direction indicated by the arrow C through the commuting element 5, and the other side of the eject link 7 is pressed by the connecting element 8b of the lock arm 8, said eject link 7 is pushed and the connecting element 6b reaches the position shown by a phantom line in FIG. 1. By this way the eject lever 9 advances as indicated by the arrow D in FIGS. 1 and 3 and an autoeject action for tape back and drawing out by using the operation portion 9a of the autoeject lever 9 is effected, as will explained later. In this case, the manual eject lever 16 is not used.

Figure 8:
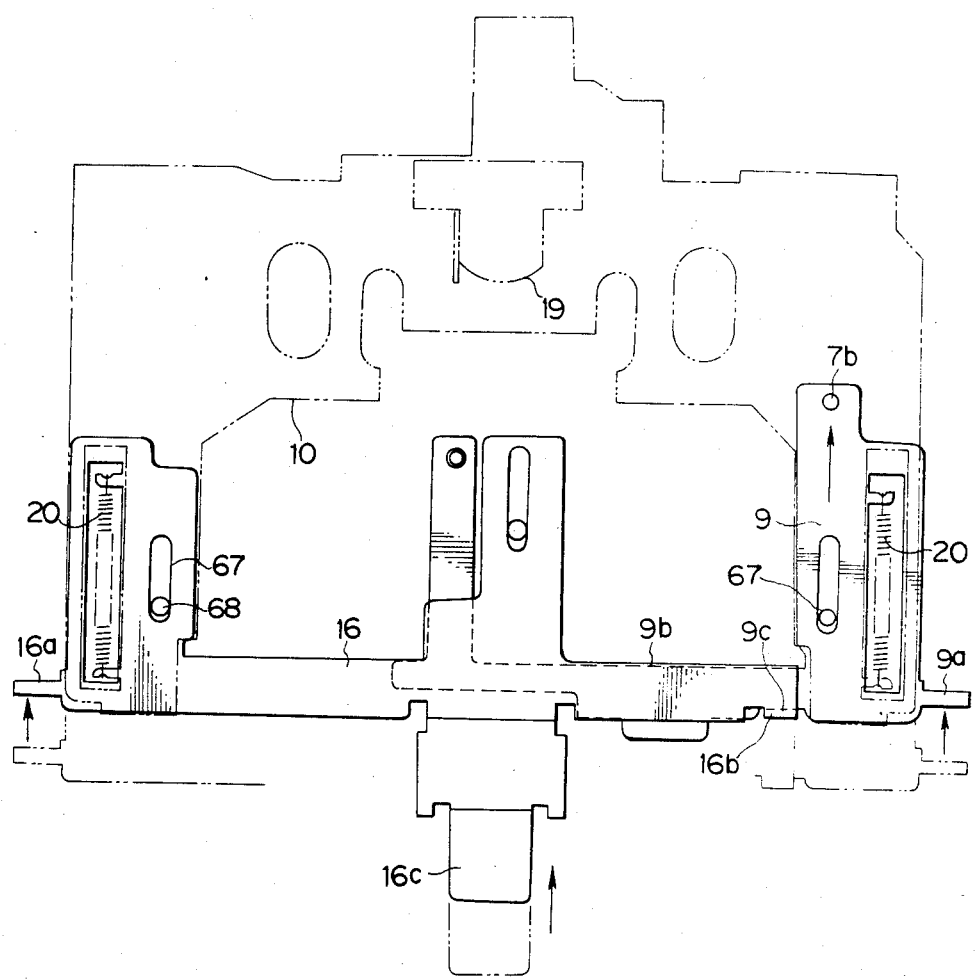
FIG. 8 is a plan view representing the arrangement of the principal elements, where the head plate has been drawn back.

FIG. 8 shows the action of various parts in the case where the manual eject lever is pushed. The eject mechanism is operated by the operation parts 16a and 9a, when said eject lever 9 is pushed through the connecting portion 16b. When an eject operation has been terminated, both the eject levers 9 and 16 are returned by the action of the springs 20, 20.

Figure 4:
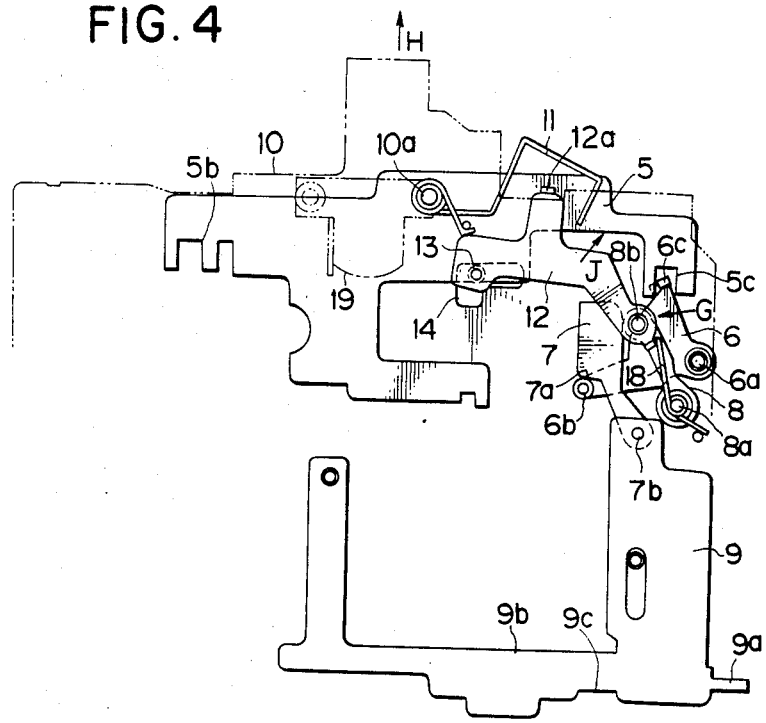
FIG. 4 is a plan view, which corresponds to that shown in FIG. 3, but represents the arrangement where the head plate has been drawn back.
Figure 5:
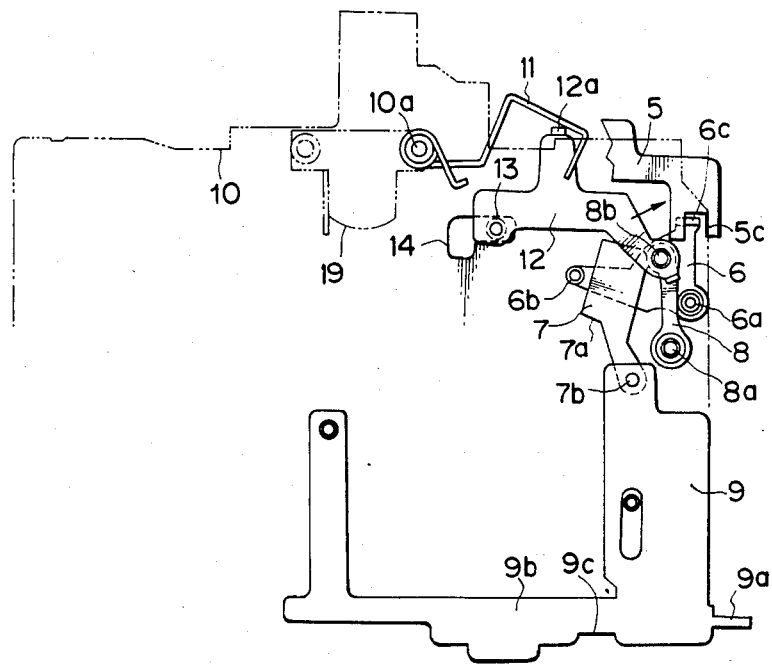
FIG. 5 is a plan view representing the arrangement of the same elements, where the operation link has been further rotated.

Hereinbelow the action of the commuting mechanism will be explained. As it is described above, it is in the state where the head plate is advanced (FIG. 3) that the autoeject action is effectuated. In this state, the connecting element 8b disposed on the lock arm 8, which is interlocked with said lock plate 12, is fixed at the position indicated in FIGS. 3 and 4 by the fact that the lock plate 12 is rotated in the clockwise direction by the action on its connecting portion 12a by the commuting spring 11 disposed on the head plate 11, and the connecting element 13 is locked in the bent lower locking part of the locking hole 14, so that the lock plate 12 is locked. This enables driving the eject link 7 in the direction indicated by the arrow clockwise in FIG. 3 through the connecting element 6b by rotation of the operation link 9. To the contrary, when the head plate 10 is drawn back, the head plate 10 goes in the direction of the arrow H as indicated in FIG. 4, and the spring 11 mounted on said head plate 10 ceases to push the connecting portion 12a of the lock plate 12. Thus the lock arm 8 is rotated in the direction of the arrow G by the spring 18 mounted on the region of the pivot 8a of the lock arm and the lock plate 12 rotates in the direction of the arrow J. Consequently, the connecting element 13 is freed from the lock portion of the lock hole 14, and as indicated in FIG. 5, the operation link 6 rotates in the clockwise direction. When the connecting element 6b pushes the eject link 7, the lock arm 8 rotates in the clockwise direction and the eject link 7 does not effect the eject action. Since the eject lever 9 linked with this is not actuated too, no eject action is effected.

In the autoeject described above, as indicated in FIG. 7 by the fact that, from the state in which the cassette 60 is thrown down on the rack 50, the operation part 9a of the eject lever 9 is moved by motor drive in the direction of the arrow K, the eject member 48 rotates counterclockwise in the direction of the arrow L, and the cassette 60 is raised up together with the cassette guide 46 in the direction of the arrow M. At the same time the pivotable supporting frame 44 rotates in the direction of the arrow N and liberates the commuting portion 44b from the locked state in the lock portion 143c in the cam fringe 143. The swing lever 43 rotates in the counterclockwise direction by the action of the spring 55, which has stored energy during the charge action, as explained above. That is, the working portion 143b of the swung lever 43 pushes the front end in the charging direction of the cassette 60 and ejects the cassette 60 in the direction of the arrow P. At the beginning of the eject action, when the working portion 143b rotates a little in the direction of the arrow O, the pressing force effected by said working portion 143b to the contacting portion 47a of the motor switch is removed. On the other hand, since the locking action between the lock portion 143c and the connecting portion 44b is also removed by rotation of the pivotable supporting frame 44 described above in the direction of the arrow N, a suitable eject action is effected by the stored energy in said spring 55 after the disconnection of the power for the motor 80, which is initiated by the removal of the pressing force effected on the contacting portion 47a of the switch, as described above.

Figure 10:
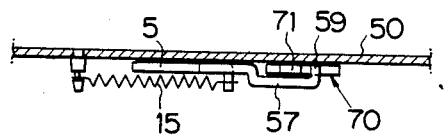
FIG. 10 is a cross-sectional view of the mechanism shown in FIG. 9.

In the construction indicated in FIGS. 6 and 7, during the insertion of the cassette 60, the spring 55 disposed on said swing lever 43 stores energy for the eject force. That is, it is clear that, when the cassette 60 is inserted either manually or automatically from the eject state indicated in FIG. 6, the passive portion 143b of the swing lever 43 is pushed and said swing lever 43 pivots around the pivot 43b and the spring 55 extends and stores energy. The connecting portion 44b of the cassette guide pivotable frame 44 quits the engaging portion 143a and then is slided along the arc-shaped cam edge 143. During such a sliding course along the cam fringe 143, said cassette guide pivotable frame 44 is held approximately in the state indicated in FIG. 6 and cannot pivot. However, when the cassette 60 is inserted sufficiently, the spring 55 stores sufficient energy. Thus, when the engaging portion 44b reaches the extremity of the cam edge 143, the extremity portion of the pivotable supporting frame 45 is rotated by an action of the spring 56 in the counterclockwise direction and rotates said pivotable supporting frame 44 in the counterclockwise direction through the cassette guide linked by the pivot 45b. Thus the state indicated in FIG. 10 is established, where the engaging portion 44b is locked in the locking portion 143c.

Figure 9:
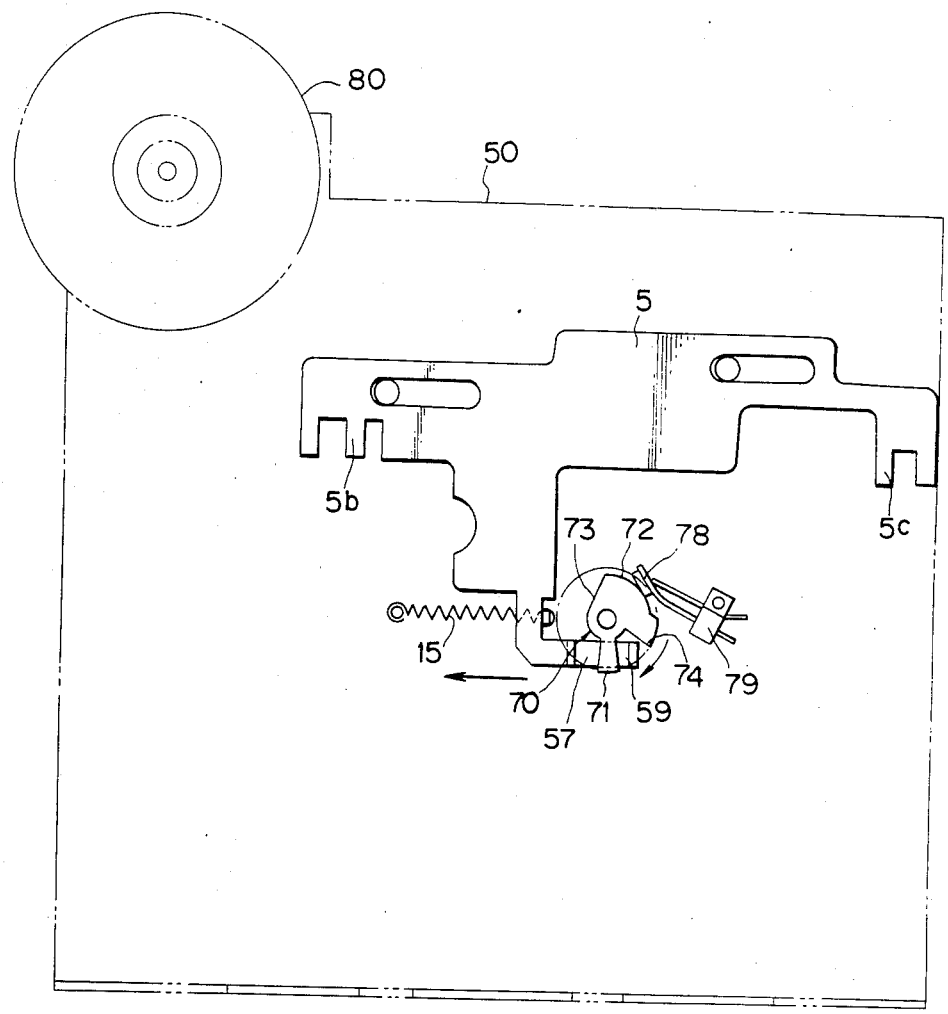
FIG. 9 is a paln view representing the playback mode, where the motor switch has been closed through the cam portion by the commuting element.
Figure 11:
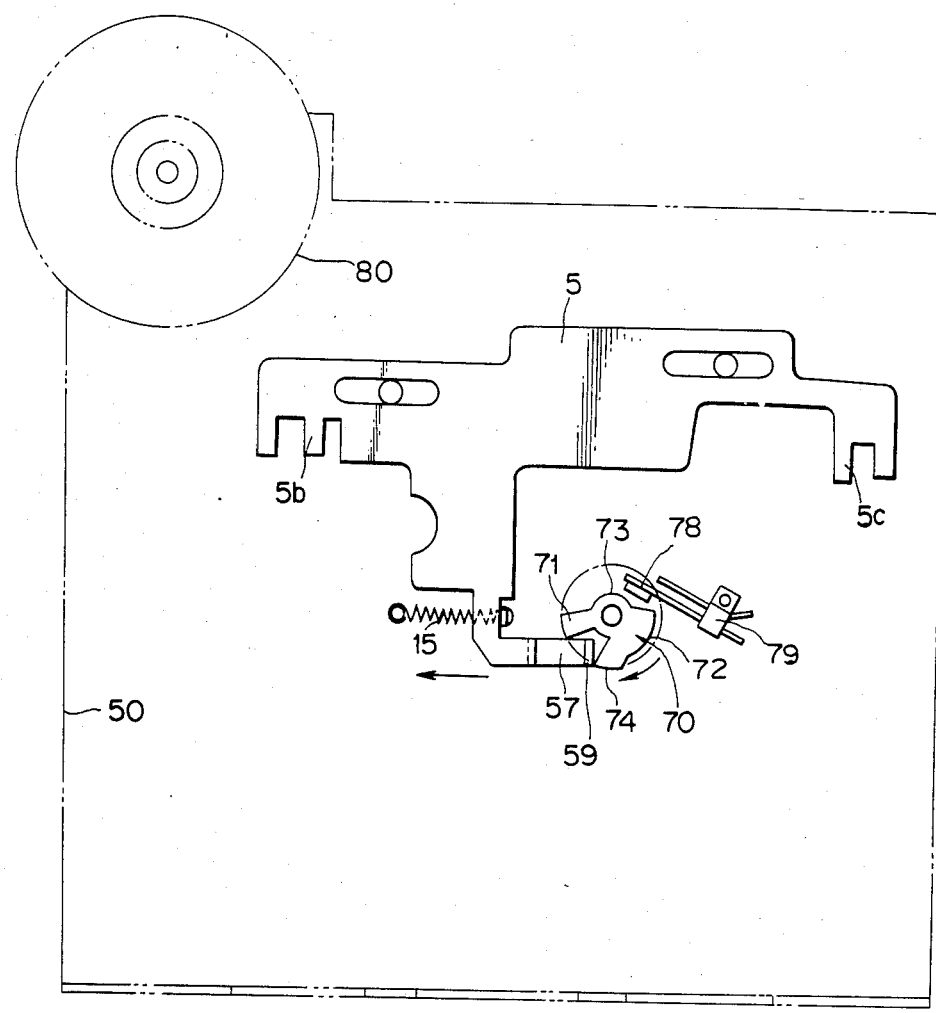
FIG. 11 is a plan view representing the eject mode.
Figure 12:
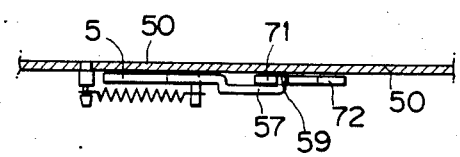
FIG. 12 is a cross-sectional view of the mechanism shown in FIG. 11.

In the construction and working condition described above, it is clear that, when the commuting element 5 is slid toward the right from the state shown in FIG. 1 to that shown in FIG. 3, the operating portion 78 is pushed by the cam portion 74, as indicated in FIG. 9, and the motor switch 79 is closed. When the commuting element 5 is returned as indicated in FIGS. 11 and 12, the cam element 70 rotates in the reverse direction and said switch 79 is opened. By choosing adequately the working region for the working portion 78 of the cam portion 72 in the cam member 70, it is possible to obtain adequately the working timing of the switch 79. It is also possible to realize a preferable eject action, utilizing suitably energy stored in the spring 55 mounted on the eject mechanism during the charging course of the cassette, as indicated in FIGS. 6 and 7, after an off-operation shown in FIG. 11.

As explained above, according to this invention, with respect to the autoeject mechanism in such a kind of tape recorders, a spring mounted on the swing lever stores energy for the eject force during the charging course of a cassette. For an eject action, the motor switch is opened by locking the swing lever in this state with the cassette guide pivotable frame and by releasing the locked state and starting to rotate the swing lever. After the motor switch has been opened, it is possible to effect a smooth eject action by using the spring thus energized, as indicated above. Consequently it is completely prevented that the eject operation is stopped in mid course. It is also possible to effect suitably the eject action either by an automatic simple operation by using an intermittent gear driven intermittently by a motor or manually.

I claim:

1. An ejection mechanism for a tape recorder comprising:

a motor;

a driving gear driven by said motor;

an intermittent gear having an intermittent portion disposed so as to engage with said driving gear;

a cam portion disposed on said intermittent gear;

a commuting element (5) having a follower which is in contact with said cam portion so as to be driven between extreme positions by rotation of said intermittent gear by said driving gear;

an operational link (6) interlocked to be driven by said commuting element;

an eject link (7) disposed so as to be able to engage with said operation link to be driven by the motion thereof;

an eject member (9) connected to be driven by the motion of said eject link;

an eject element (48) interlocked with said eject member;

a cassette guide (46) for receiving an inserted cassette;

a pivotally mounted frame (44) coupled to said cassette guide so as to raise and lower said cassette guide responsively to the movement of said frame, said frame being operable between a raised position disengaging an inserted cassette from a set of reel-base drives of said recorder and a seated position effectuating engagement therewith;

first spring bias means (56,45) for urging said frame to said seated position, said eject element being coupled to said frame so that movement of said eject element in a given direction by said eject member urges said frame against said first spring bias means to said raised position;

a pivotally mounted swing lever (43) having a cam edge (143) at its extremity configured to arrestingly engage portions (44b) of said pivotal frame in the raised position thereof over a range of latching orientations of said swing lever and to remove said arresting engagement therefrom at a terminal released orientation of said swing lever; and second spring bias means for urging said swing lever from said terminal orientation through said range of latching orientations thereof, said swing lever including an arresting portion (143b) urged by said second spring bias means to oppose the insertion of a cassette into said cassette guide so that with said frame in a raised position insertion of said cassette urges said swing lever through said range of latching orientations to said released orientation, and so that when said frame is moved to said raised position said swing lever moves through said range of latching orientations to ejectingly urge said cassette out of said cassette guide.

2. The ejection mechanism of claim 1 further including a manual eject member (16) releasably coupled to said eject member (9);

a lock plate (10);

a pivotally mounted lock arm (8) for coupling the motion of said lock plate to said eject link;

a cam operating member (59) formed in said commuting element;

a cam element rotationally driven by said cam operating member; and a switch (79) operated by said cam element so as to open and close the motor-driving circuit according to the position of said commuting element.

* * * * *